United States Patent [19]

Boor

[11] 4,136,582
[45] Jan. 30, 1979

[54] SHAFT AND BORE COMBINATION
[75] Inventor: Francis H. Boor, Lafayette, Ind.
[73] Assignee: Fairfield Manufacturing Co., Inc., Lafayette, Ind.
[21] Appl. No.: 678,972
[22] Filed: Apr. 21, 1976
[51] Int. Cl.² .............................................. F16H 1/42
[52] U.S. Cl. ........................................ 74/710; 74/467
[58] Field of Search ................ 74/467, 710; 184/6.12, 184/11 R, 11 A; 308/78, 92, 97, 98

[56] References Cited
U.S. PATENT DOCUMENTS

| 1,108,809 | 8/1914 | Stockly | 308/92 |
| 1,377,866 | 5/1921 | White | 308/78 |
| 3,966,020 | 6/1976 | Quick | 184/11 R |

FOREIGN PATENT DOCUMENTS 2162969  6/1973  Fed. Rep. of Germany ............. 74/710

Primary Examiner—Stephen C. Bentley
Attorney, Agent, or Firm—Woodling, Krost, Granger & Rust

[57] ABSTRACT

The present application discloses structure which produces area contact in place of point or line contact between a cylindrical shaft and a cylindrical bore. When the area of contact is increased, the unit pressure is reduced which results in less wear and longer life. The combination of the present invention includes a shaft having an external surface and a member in the nature of a gear or the like which has a bore surrounding the shaft and which bore includes an internal surface. The present invention involves the situation wherein one of the shaft and member is fixed and the other of the shaft and member is rotatable. The improvement of the present invention involves the situation wherein the surface of the rotatable one of the two above mentioned members is provided with a first cooperating surface portion which has a constant radius and which extends through an angle 360°. The surface of the fixed one of the members comprises a second cooperating surface portion which has a radius which matches the constant radius of the rotatable member which extends through 360°; however, the second cooperating surface portion extends through an angle of less than 180°. The first and second cooperating surface portions normally, although not necessarily, are axially coextensive. The surface of the fixed one of the members, in addition to the second cooperating surface portion, has an additional surface portion which has a dimension which may broadly referred to as a radius dimension, which is different than that of the radius of the first and second cooperating surface portions. In the case of a fixed shaft, which has the less than 180° surface portion thereon, this additional surface portion has a radius which is smaller and in the case of a fixed member which has a bore therein which carries the less than 180° surface portion, this additional surface has a radius which is larger than the radius of the surface which extends through an angle of less than 180°. The present disclosure illustrates the present invention as applied to a fixed shaft supporting a rotatable gear, sprocket, pulley or any other method of power of transmission, wherein the load direction is constant to the shaft and the disclosure, also, illustrates the situation where the load direction remains constant to the bearing in the case of a rotating shaft supported by bearings. Additionally, the present invention discloses the invention as used in land vehicle differentials.

8 Claims, 15 Drawing Figures

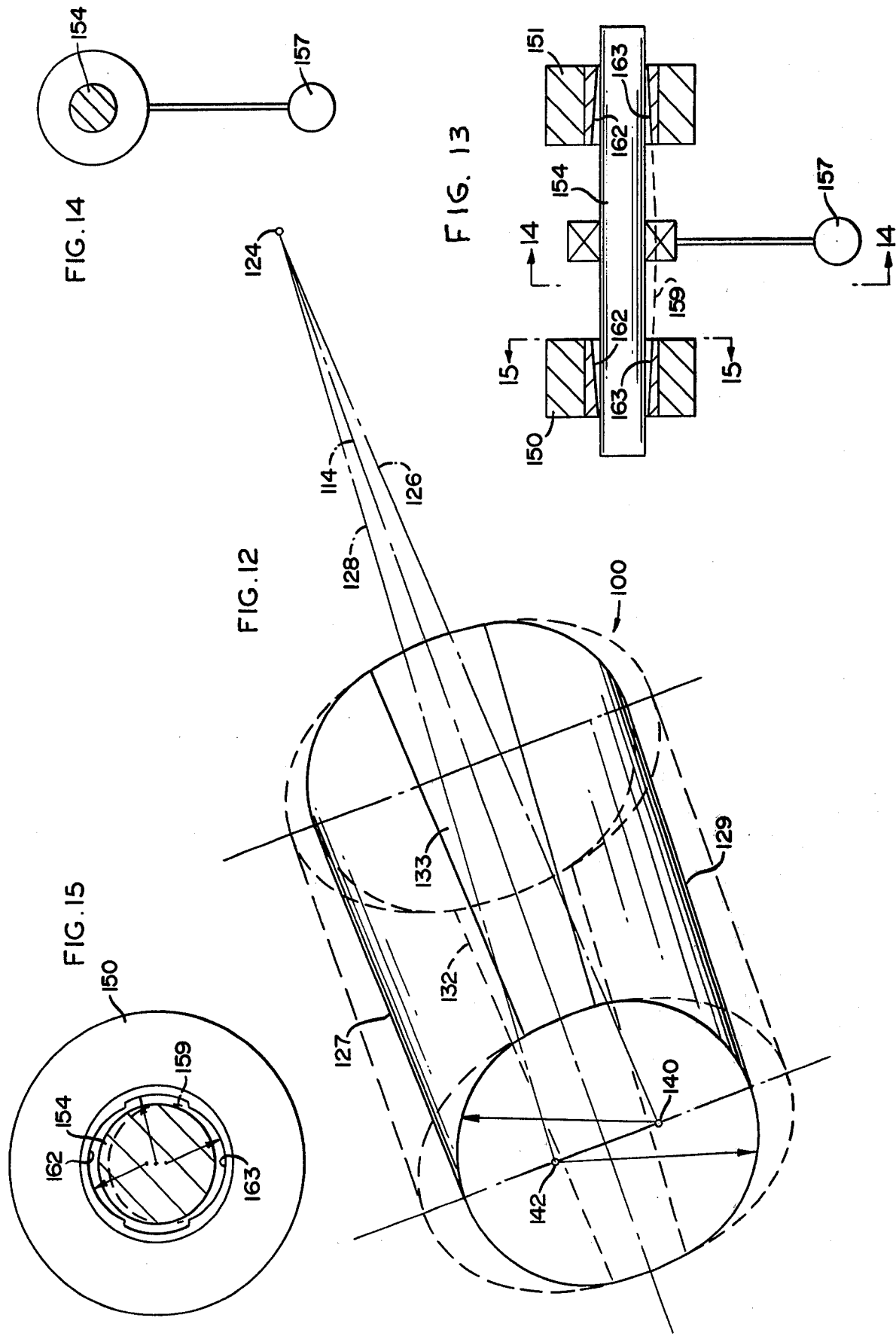

SHAFT AND BORE COMBINATION

The present invention relates to a structure which provides an area contact in place of a point or line contact between a cylindrical shaft and a cylindrical bore. By increasing the area of contact, pressure is reduced, which results in less wear and longer life.

The present invention and structure matches the external surface of a shaft to the internal surface of the mating part or vice versa, without reducing the desired clearance needed for lubrication.

The main object of the conforming radii of the present invention is to solve a paradoxical problem. The problem normally arises because in order to decrease contact stress, the shaft diameter should be made as large as possible compared to the bore and in order to increase lubrication between the surfaces the shaft diameter should be made smaller. The present invention does not compromise contact stress and lubrication, but provides an ideal condition for the contact and allows freedom of design by varying the offset of radii to give different clearance volumes.

Other objects and a fuller understanding of this invention may be had by referring to the following description and claims, taken in conjunction with the accompanying drawings, in which:

FIG. 12 is a schematic representation illustrating the grinding procedure utilized in order to produce the special bearing surfaces disclosed herein and particularly seen in FIGS. 10 and 11 of the drawings;

FIG. 13 is an elevational view in section illustrating the teachings of the present invention as particularly seen and illustrated in FIGS. 10, 11 and 12, however, showing the invention applied to fixed bearings or bushings and a rotating shaft;

FIG. 14 is a view taken generally along the line 14—14 of FIG. 13; and

FIG. 15 is a view taken generally along the line 15—15 of FIG. 13.

Figure 1:
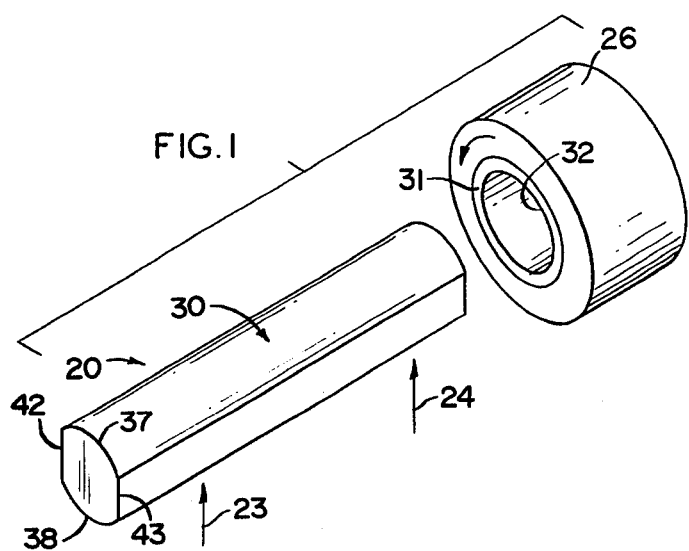
FIG. 1 is an isometric view illustrating a fixed shaft as supporting a rotatable member such as a gear, sprocket or pulley with the rotatable member in this instance illustrated as being off of the shaft.
Figure 2:
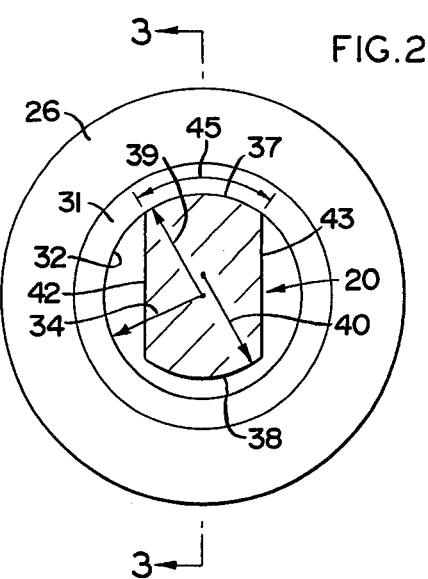
FIG. 2 is a cross sectional view taken through the rotatable member and shaft of FIG. 1 and looking in an axial direction and is representative of a cross sectional view through a planetary shaft.
Figure 3:
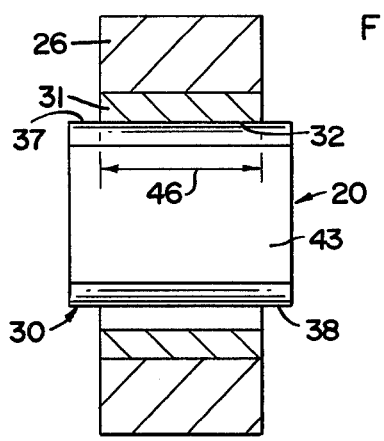
FIG. 3 is a view taken generally along the line 3-3 of FIG. 2.
Figure 4:
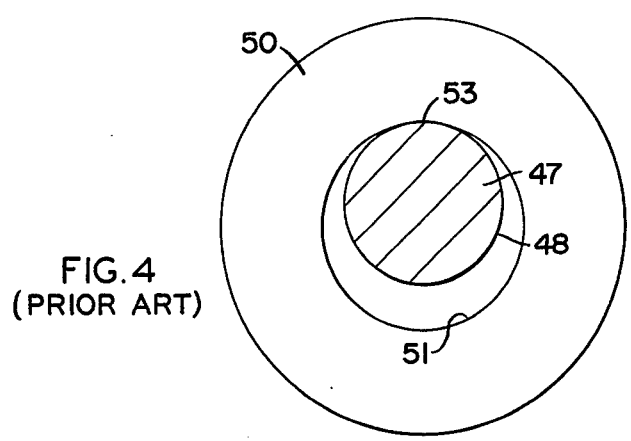
FIG. 4 is a cross sectional view through a shaft and rotatable member analogous to FIG. 2, but illustrating conventional designs existing in the prior art and not conforming to the present invention.

FIGS. 1 through 3 of the drawings illustrate the principles of the present invention as applied to a fixed shaft and a rotatable member which has a bearing surface for engagement with the shaft. As mentioned hereinabove, the rotatable member may be a gear, sprocket, pulley construction or any other method of power transmission; however, will be referred to herein simply as a rotatable member. The principle of the invention involves the matching of the radii of the engaging surface or surfaces on the fixed shaft with the bore of the rotatable member. FIG. 4 illustrates presently existing structures and inherent problems in such structures. The shaft of FIGS. 1 through 3 has been identified by the reference numeral 20 and is fixedly supported in its position by mounting means 23 and 24 indicated schematically in FIG. 1. It is to be understood that the rotatable member 26 in its use, is located on the shaft 20 as seen in FIGS. 2 and 3. The purpose of the illustration in FIG. 1 is simply for clarity. The shaft 20 is provided with an external surface 30 and this identification of the external surface is meant to comprehend the entire 360° extent of the external surface of the shaft. The rotatable member 26 is provided with a sleeve 31 which embodies a bore and this bore has an internal surface which is identified by the reference numeral 32.

The improvement of the present invention includes a first cooperating surface portion on the internal surface 32, which in this particular construction includes the entire 360° surface of the bore 32. This surface has a constant radius which extends through the recited angle of 360°. Referring to FIG. 2, the radius of surface bore 32 is identified by the reference 34.

The external surface 30 of the shaft 20 is provided with two second cooperating surface portions, which are identified by the reference numerals 37 and 38, respectively, and the respective radii of these two surface portions are identified in FIG. 2 by the reference numerals 39 and 40, respectively. The external surface 30 of the shaft 20 is provided with two flattened surfaces or surface portions 42 and 43, respectively, which extend between opposed ends of the surface portions 37 and 38 as best illustrated in FIG. 2. These two flattened surfaces 42 and 43 may be said to have a dimension less than that of the radii 39 and 40 as measured from the center of either of the radii 39 and 40. While the surfaces 39 and 40 have been illustrated herein as being flat or of a flattened configuration, it is not necessary that they be precisely of this construction, it only being necessary that they be of a dimension preferably less than either of the radii heretoforementioned.

It is, also, preferable that the axial extent of the cooperating surface portions 37 and 38 be substantially the same as the axial extent of the internal surface 32 defined by the bore of the rotatable member 26.

Since the radii (39, 40) of the external surface portions (37, 38) of the shaft have been matched to the radii (34) of the bore 32, it will be seen that there is full area contact between the surfaces over the angular extent indicated by the reference numeral 45 in FIG. 2 and for the axial extent 46 shown in FIG. 3. The full engagement of the surface portion at 45 as indicated in FIG. 2 occurs upon rotation of the rotatable member 26 in a given direction and under given torque conditions and different rotation and/or torque conditions will cause engagement of surface portion 38 with the bore 32 in like manner providing full area contact between surface portion 38 and the bore 32.

Comparison of the structure of the present invention as illustrated in FIGS. 1 through 3 with the prior art can best be made by reference to FIG. 4 of the drawings. FIG. 4 illustrates a fixed shaft 47 having an external surface 48 of a constant radii throughout 360° of its angular extent. A rotatable member 50 is illustrated having a bore 51 of a fixed constant radii throughout 360° of its angular extent. The radius of the shaft 47 and the radius of the bore 51 are different, thereby resulting in line contact occurring at the place indicated by the reference numeral 53 in FIG. 4. It is theoretically possible, in the structure of FIG. 4, to have the radius of the external surface 48 of the shaft exactly equal the radius of the bore 51 so as to provide an area contact between the two mating surfaces; however, under these theoretical conditions there is no clearance volume between the two members and therefore no space exists for lubricant which is necessary to appropriately lubricate the two relatively moving surfaces. It will, therefore, be apparent that the structure of FIGS. 1 through 3 solves the paradoxical problem which previously existed. The structure of FIGS. 1 through 3 solves the problem by providing a structure which produces a large area contact between the shaft and bore of the rotatable member and still provides a large clearance volume to contain the needed lubricant.

Figure 5:
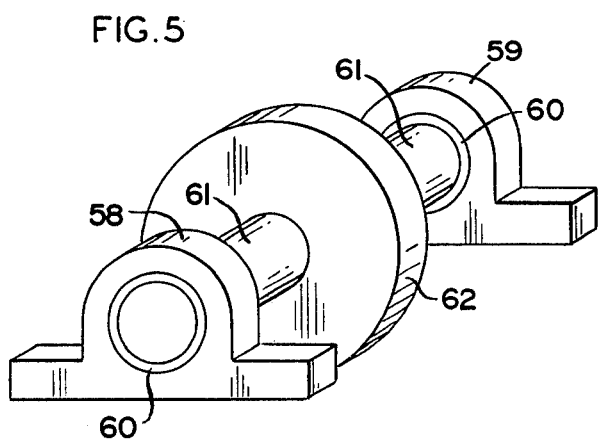
FIG. 5 is an isometric view illustrating the opposite of that shown in FIGS. 1, 2 and 3, namely fixed bearings or bushings supporting a rotatable shaft which shaft includes a load.
Figure 6:
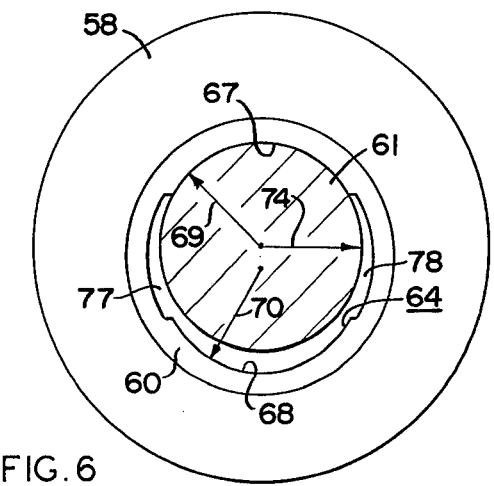
FIG. 6 is a cross sectional view taken through the shaft and bearing of FIG. 5 illustrating the matching radii principle as, also, illustrated in FIGS. 1, 2 and 3.

The structure disclosed in FIGS. 1 through 3 illustrates the condition of the load "constant to the shaft"; however, the same invention may be applied to the condition of the load "constant to the bearing or bushing". This condition is illustrated in FIGS. 5 and 6 of the drawings which show bearings 58 and 59 supporting a rotatable shaft 61 carrying a load 62. Each of the bearings 58 and 59 is of identical construction and this construction is best illustrated in FIG. 6 which shows the bearing 58 having a sleeve 60 which defines a bore 64. The bore is provided with an internal surface identified by the same reference numeral and this surface is provided with two second cooperating surface portions 67 and 68 each havung a radius which matches the constant radius of the shaft 61. The constant radius of the shaft extends through an angle of 360°, whereas the surfaces 67 and 68 each extend through an angle of less than 180°. The radius of surface portion 67 is indicated by reference numeral 69, the radius of surface portion 68 is identified by reference numeral 70 and the radius of shaft 61 is indicated by reference numeral 74. The surface 64, which defines the bore in each of the bearings 58 and 59, in addition to being provided with the cooperating surface portions 67 and 68, is provided with an enlarged portion between each end of the surface portions 67 and 68 and these enlarged portions are identified by the reference numerals 77 and 78, respectively. These enlarged portions do not provide engagement with the external surface of the rotatable shaft, but do provide a clearance volume for containing lubricant to insure proper lubrication of the mating surfaces. The position of the rotatable shaft 61 with respect to the surface portion 67 and illustrated in FIGS. 5 and 6 is for one condition of rotation and torque input. It is understood that if the torque input and/or rotation of the shaft is different, the external surface of the shaft would engage the surface portion 68. It will be clear to those skilled in the art that the embodiment illustrated in FIGS. 5 and 6 illustrates the application of the present invention to the situation where the bearing is held in a fixed condition and the shaft rotates whereas in FIGS. 1 through 3 the shaft is held in a fixed position and the bearing portion or exterior member rotates.

The present invention is, also, applicable in a more sophisticated manner to a conventional bevel gear differential in which the input power is divided into two outputs. The power in such a construction is transmitted from the differential housing to the spider, to the pinions, to the side gears and then through shafts to the driving wheels. In this particular construction, as in the application of the invention as described above, the unit pressure is reduced between mating surfaces by matching the shape of the surfaces. This changes "point" or "line" contact to "area" contact. The differential spider arm radius is made the same as the pinion bore radius. In addition to the radii being duplicated, the surface "cylinder" is tilted which allows the spherical back of the pinion to conform to the differential housing internal surface, which is spherical in configuration.

Figure 7:
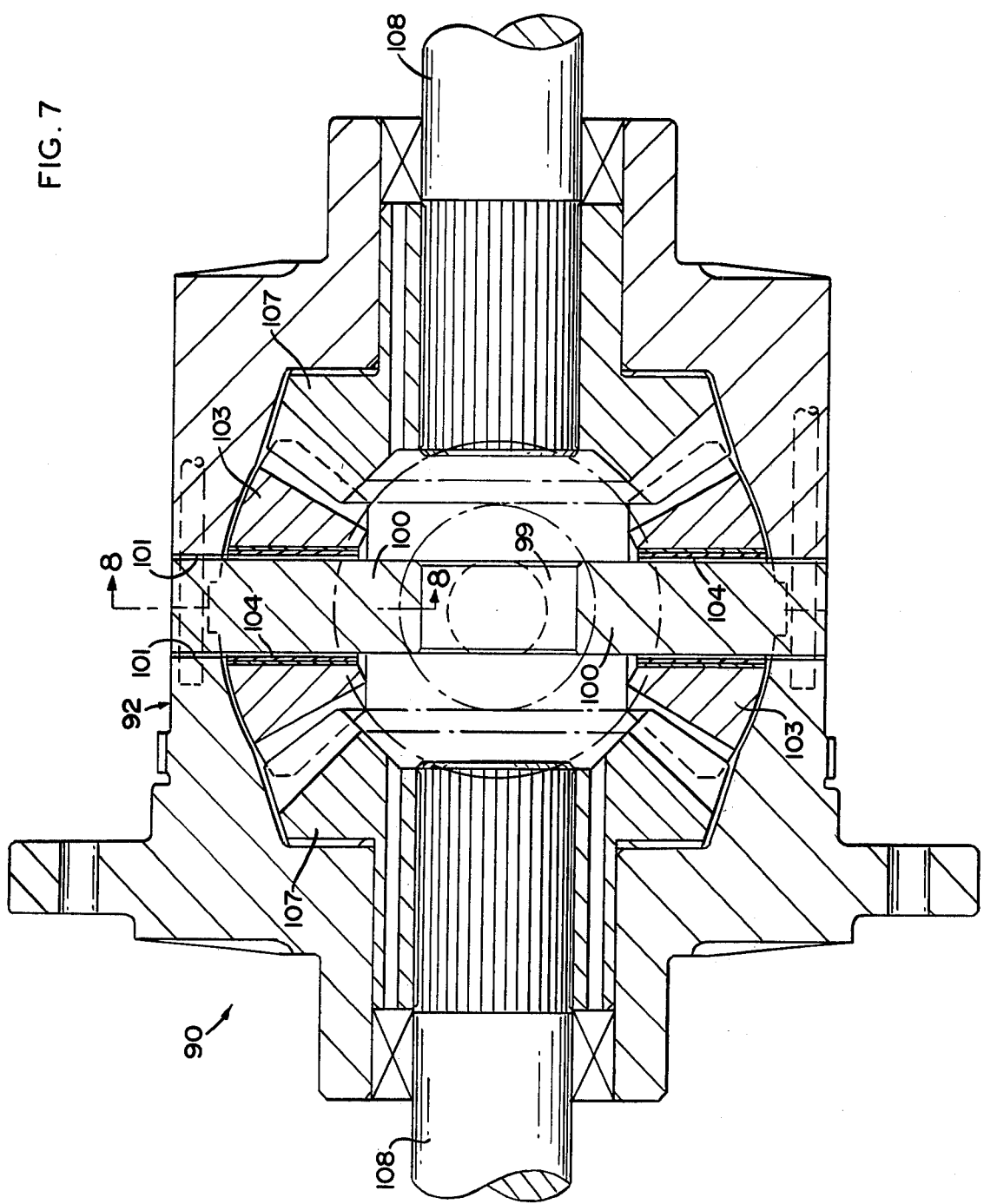
FIG. 7 is an elevational view in section of a vehicle differential to which the invention of the present application has been applied.

FIG. 7 of the drawings illustrates a differential 90 to which the teachings of the present invention have been applied. The differential 90 includes a case or housing 92 made up of two complementary parts which are appropriately secured together. The housing 92 is provided with bores at either side thereof for the reception of two side gears Splined which side gears are each provided with splined bores. Splinded axles 108 are rotatively connected to each of the side gears as shown in FIG. 7. A spider 99 is centrally positioned within the housing 92 and is provided with four arms 100, each identical in construction. The spider is secured in position in the housing by means of the outboard ends of the arms 100 being captured in support surfaces 101 on the mating faces of the two complementary parts which make up the housing 92. Four pinion gears 103 are provided, each with a bore 104, and the pinion gears are supported by means of the arms 100 of the spider being received in the bores 104. The differential housing 92 is rotated about the axis of the side gears 107 by means of a ring gear secured to the exterior of the housing and engaging with a drive gear normally secured to the end of the drive shaft of the vehicle.

The power flow through the differential, as mentioned hereinabove, starts with torque being applied to the housing 92 by means of the aforementioned drive shaft and gear engaging the ring gear on the exterior of the housing. This torque is then transmitted to the four arms 100 of the spider 99 and from there the torque is transmitted to the four pinion gears 103. The pinion gear teeth are in contact with mating teeth on the two side gears 107 and this transmits the torque to the two axles 108 of the vehicle and to the wheels.

Figure 8:
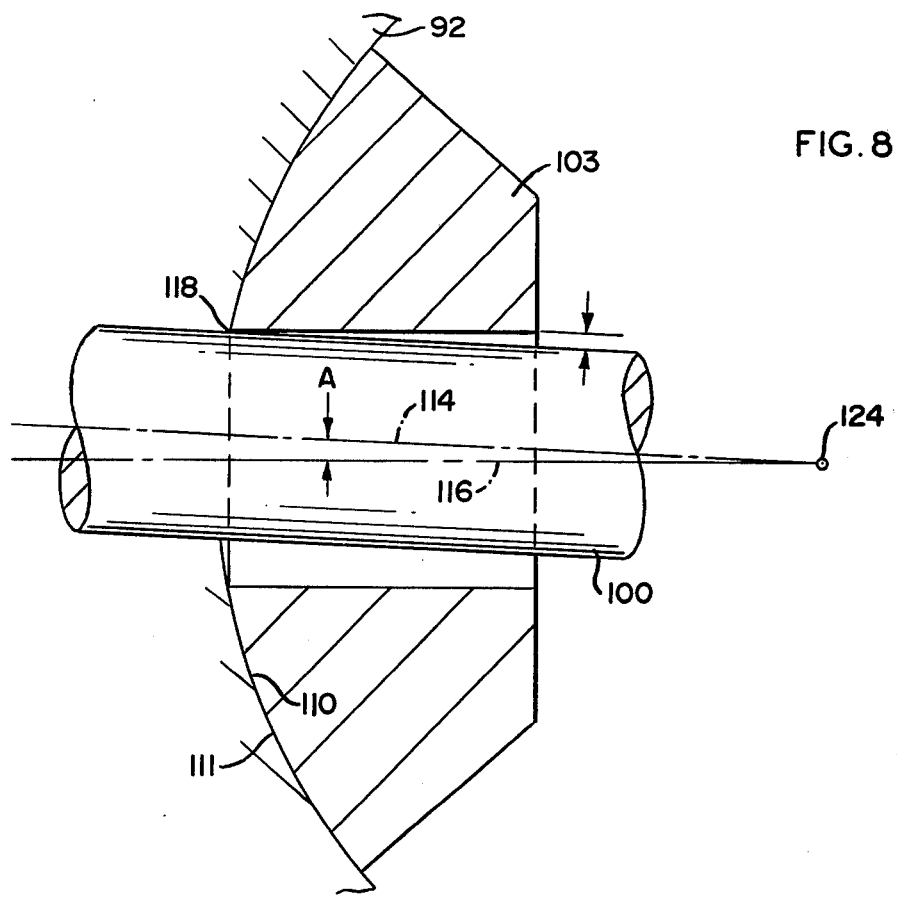
FIG. 8 is a fragmentary view in section taken generally with line 8—8 of FIG. 7 illustrating the condition existing in the prior art.

FIG. 8 illustrates what happens when torque is applied to the spider arms 100 in a conventional differential. In this case the pinion gear 103 which engages a spherical surface 110 on the inner surface of the housing by means of a spherical surface 111 on the back of the pinion gear, has an angular displacement with reference to the centerline or axis 114 of the spider arm. This angular displacement is illustrated by angle A between axis 116 of the pinion gear 103 and axis 114 of arm 100. This produces point contact in the area indicated by the reference numeral 118. The housing center and pinion cone center are illustrated at 124.

Figure 9:
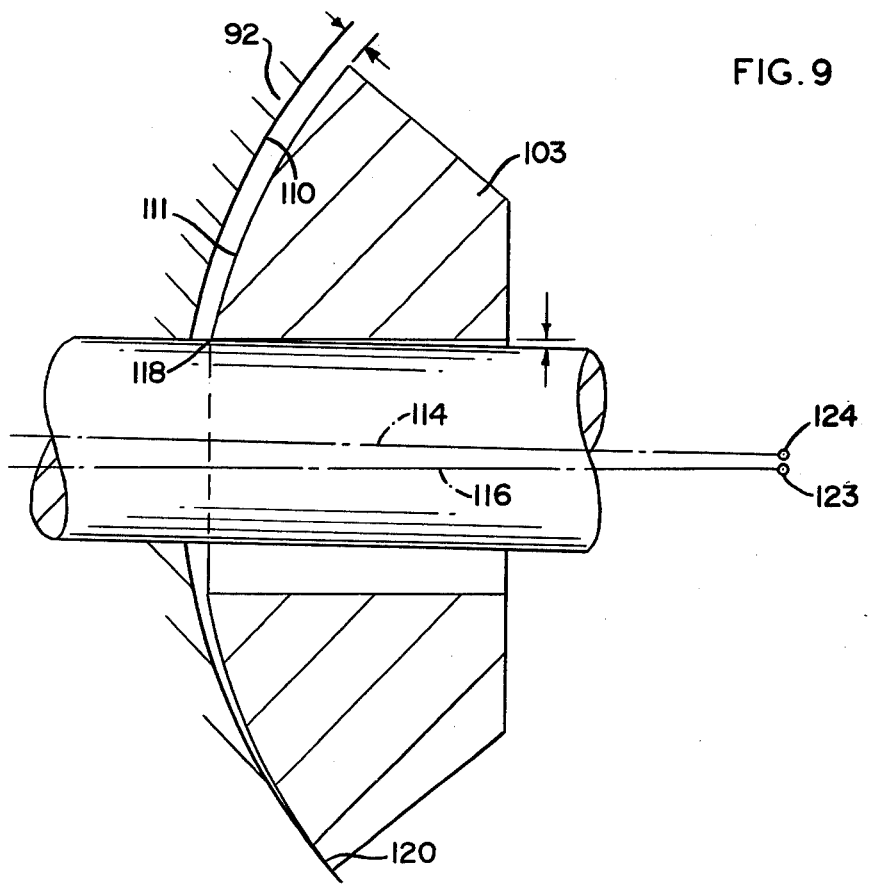
FIG. 9 is a view similar to FIG. 8 and illustrating the prior art.

FIG. 9 is a view which illustrates what happens when the spider arm reaction and housing reaction try to redistribute the load of FIG. 8. With the redistribution of the load as illustrated in FIG. 9 the pinion gear will assume a position as shown in this view with point contact in the pinion bore at about the same place as illustrated in FIG. 8 and, also, identified by the reference numeral 118, as well as point contact 120, between the pinion gear 103 and the spherical surface 110 on the inside of the housing 92. It will be noted that the pinion gear axis 116 has reoriented itself and in effect is provided with a new center 123 which is the pinion cone center.

Figure 10:
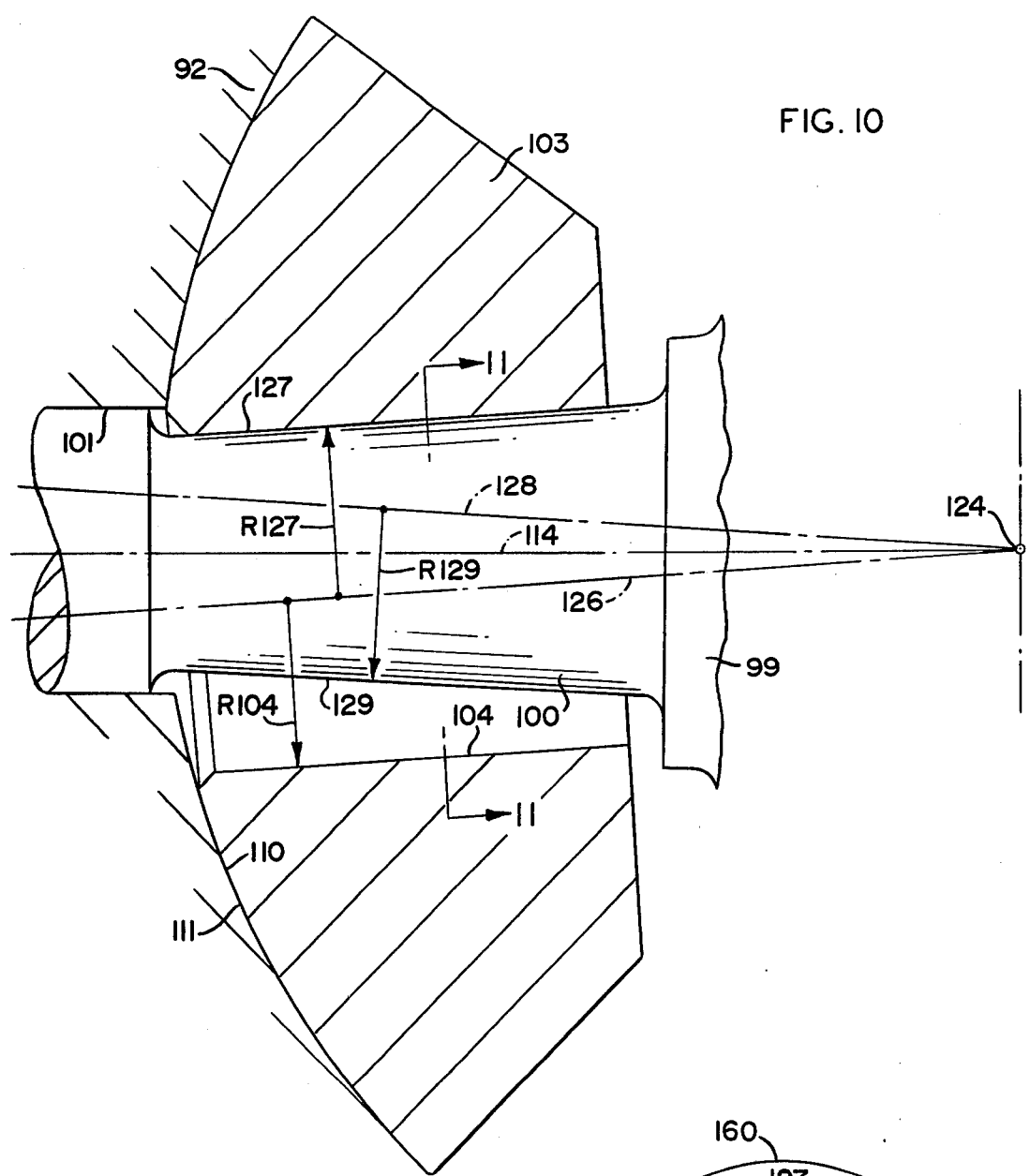
FIG. 10 is a view similar to FIGS. 8 and 9, but showing the special bearing surfaces with matched radii provided on the spider arms of the differential in accordance with the teachings of the present invention.
Figure 11:
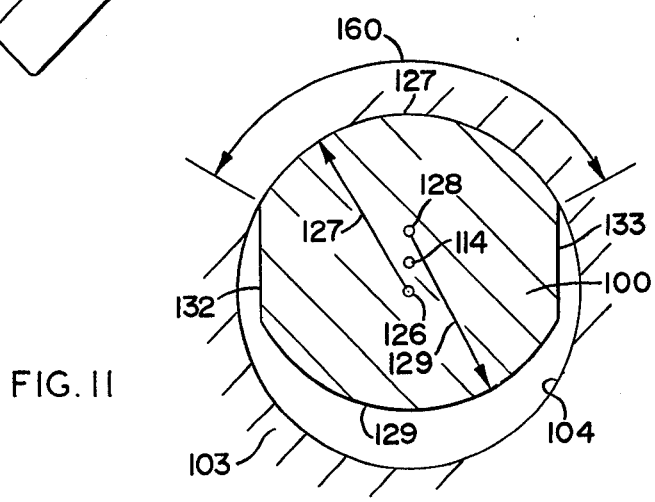
FIG. 11 is a view taken generally along the line 11—11 of FIG. 10.

FIGS. 10 and 11 illustrate the improvement of the present invention and show first and second opposed bearing portions on each of the arms 100 for bearing engagement with the bores 104 of each of the pinion gears 103. The first bearing surface has been identified by the reference numeral 127 and the second bearing surface has been identified by the reference numeral 129. The first bearing surface 127 is provided by a cylindrical grinding operation upon the spider arm 100. The cylindrical grinding operation is accomplished by grinding the bearing surface 127 which is a portion of a cylindrical surface and this is accomplished by cylindrically grinding the same about the axis 126. In like fashion the second bearing surface 129 is produced by a cylindrical grinding operation accomplished by grinding about the axis 128. It will be noted from viewing FIG. 10 that the notation R127 is the radius of bearing surface 127; that R129 is the radius of bearing surface 129 and these are both equal to R104 which is the radius of the pinion gear bore 104. With rotation of the differential housing 92 in a given direction and with the torque in a given direction, the distribution of the load between the spider arm and pinion gear causes pinion gear 103 to assume the position shown in FIG. 10 where the first bearing surface 127 engages the pinion gear bore 104 providing for area contact, as distinguished from point or line contact as illustrated in FIGS. 8 and 9. It will also be noted that the convex spherical surface 111 on the back of the pinion gear, also, makes area contact with the concave spherical surface 110 on the inner surface of the housing 92.

FIG. 11 illustrates flat surfaces 132 and 133 extending between the opposed sides of bearing surfaces 127 and 129 and these are normally provided after the above referred to grinding operation. Surfaces 132 and 133 have not been shown on FIG. 10 simply for more ease in illustration. This figure illustrates area contact through the angular distance 160 and the axial area contact extends the full length of the pinion bore 104.

It will be appreciated by those skilled in the art that each of the bearing surface 127 and 129 comprises an arcuately and axially extending surface which tapers toward the centerline or axis 114 of the spider arm as it extends in the direction from the first end portion of the arm or in other words from the housing center 124 to the second end portion of the arm or in other words the outboard end of the arm in the area where the arm is captured by the support surfaces 101. Each of the bearing surfaces 127 and 129 have the same radius of curvature at all places along its respective axial extent and this radius is matched to the radius on the pinion gear bore 104.

FIG. 12 is a diagramatic isometric illustration showing the grinding procedure which is utilized to produce the bearing surfaces 127 and 129. In this figure the standard spider arm is indicated by the reference numeral 100 and the length of the arm which is shown in this view is the length to which the special grinding procedure is applied. The differential case center is indicated by the reference numeral 124 as in the previous FIGS. 8 through 10. In order to produce the first bearing surface 127 the arm 100 is mounted between two centers of rotation. The first center is identified by the reference numeral 140 and the second center coincides with the case center 124. The arm is then rotated and as it is rotated it is brought into contact or into engagement with the grinding wheel of a cylindrical grinder and the surface 127 is produced which is generated about axis 126 which extends from point 140 to point 124. This produces the surface which, if developed about axis 126, would produce a rectangular surface. If developed about axis 114, the surface would be trapezoidal in configuration. The radius of this surface is the same as the radius R127 shown in FIG. 10 and is equal to the pinion bore radius R104. In order to produce the second bearing surface 129 the arm 100 is mounted between centers 142 and 124 on axis 128 and is rotated about this axis and brought into contact with the grinding wheel of a cylindrical grinder which produces the surface 129, heretofore described. This surface is produced about the axis 128 and the radius of curvature of this surface is R129. It will thus be appreciated that in referring to either the bearing surface 127 or 129 it can be said that this cylindrical surface is generated about a second axis, when referring to the centerline of the original pinion arm as the first axis, and under these circumstances the second axis can be said to extend at an acute angle with respect to the first axis and the second axis tapers away from the first axis as it extends in the direction from the first end portion of the arm to the second end portion of the arm. In any event, there is produced a bearing surface or bearing portion which comprises an arcuately and axially extending surface which tapers toward the centerline of the arm as it extends in the direction from the center of the differential housing to the outboard end of the arm.

It will, also, be appreciated by those skilled in the art and by reference to FIG. 10, that functionally the first bearing surface 127 performs the intended function of the present invention when the differential housing rotates in one given direction under given torque conditions and the bearing surface 129 performs the function when the housing rotates in the other rotational direction under given torque conditions. It is, therefore, apparent that if the housing were to be rotated only in one direction under given torque conditions, only one of the bearing surfaces would be required to accomplish the function intended by the present invention.

FIGS. 13, 14 and 15 illustrate the principle of matched radii and the principle of the tilted cylinder as embodied in the structure of FIGS. 7 through 12; however, these three figures illustrate the load stationary to the bearings, as distinguished from the load being stationary to the shaft. The embodiment of FIGS. 13, 14 and 15 illustrates two fixed bearing members 150 and 151, respectively, supporting a rotatable shaft 154 which shaft carries a stationary load 157. The load exerts a force on the shaft tending to deflect the shaft to the position illustrated by the dotted line 159 and the application of the teachings of the present invention to the bearings 150 and 151 accommodates the exterior surface of the rotating shaft so that area contact is provided. Each of the bearings 150 and 151 is provided with opposed cooperating surface portions identified by the reference numerals 162 and 163, respectively. These cooperating surface portions are provided in the bore of the bearings 150 and 151 and are in effect the reverse of the bearing surfaces 127 and 129 illustrated in FIGS. 10 and 11 and which are provided on the spider arms 100. In other words, the bore of each of the bearings 150 and 151 is provided with two surface portions which have a radius which corresponds to the radius of the shaft 154 and in order that a surface portion correspond to the deflection produced in the shaft 154 by the load 157, the surface portion is tilted at a given angle to provide full surface area contact between the exterior surface of the shaft 154 and the cooperating surface portion of the bearing.

It should be noted that FIG. 15 shows the embodiment in its theoretical no load condition.

It will, therefore, be seen by those skilled in the art that the main object of the present invention is accomplished by the teachings of the "matched radii" and "tilted cylinder" as described herein. The pinciples which have been shown and described herein reduce the contact stresses between a relatively rotating shaft and the bore of a cooperating member. The present invention provides ideal contact between the two members and still permits sufficient clearance for lubricant.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In the combination of a shaft having an external surface and a member having a bore surrounding said shaft which bore has an internal surface and with one of said shaft and member being fixed and the other of said shaft and member being rotatable, the improvement including one of said internal and external surfaces comprising a first cooperating surface portion having a constant radius and extending through an angle of 360 degrees and generated about an axis, the other of said internal and external surfaces comprising two opposed second cooperating surface portions each having a radius matching said constant radius and each extending through an angle of less than 180 degrees, the centers of the radii for said two opposed second cooperating surface portions being offset from each other and from said axis, said other of said internal and external surfaces having another portion with a dimension different than that of said radii as measured from the respective centers of said radii, and said two opposed second cooperating surface portions tapering toward said axis as they extend from one end portion of said other of said internal and external surfaces to the other end portion.

2. In the combination of a shaft having an axis and an external surface and a member havng a bore surrounding said shaft which bore has an internal surface and with said shaft being fixed and said member being rotatable, the improvement including said internal surface comprising a first cooperating surface portion having a constant radius and extending through an angle of 360 degrees, said external surface comprising two opposed second cooperating surface portions each having a radius matching said constant radius and each extending through an angle of less than 180 degrees, the centers of the radii for said two opposed second cooperating surface portions being offset from each other and from said axis of said shaft, said external surface having another portion with a dimension less than that of said radii as measured from the respective centers of said radii, and said two opposed second cooperating surface portions tapering toward said shaft axis as they extend from one end portion of said shaft to the other end portion of said shaft.

3. In the combination of a differential housing having a concave spherical inner surface, a pinion spider having at least one arm extending from a central portion of the differential housing at a first end portion to an outer portion of the differential housing at a second end portion, said arm having a centerline, and a pinion gear having a cylindrical bore through which said arm extends and also having a convex spherical surface for engagement with said concave spherical surface of said differential housing, the improvement comprising first and second opposed bearing portions on said arm for bearing engagement with said bore of said pinion gear, each said bearing portion comprising an arcuately and axially extending surface which tapers toward said centerline of said arm as it extends in the direction from said first end portion to said second end portion of said arm, said surface having the same radius at all places along its axial extent and said radius being matched to the radius of said pinion gear bore.

4. In the combination of a differential housing having a concave spherical inner surface, a pinion spider having at least one arm extending from a central portion of the differential housing at a first end portion to an outer portion of the differential housing at a second end portion, said arm having a centerline, and a pinion gear having a cylindrical bore through which said arm extends and also having a convex spherical surface for engagement with said concave spherical surface of said differential housing, the improvement comprising a bearing portion on said arm for bearing engagement with said bore of said pinion gear, said bearing portion comprising an arcuately and axially extending surface which tapers toward said centerline of said arm as it extends in the direction from said first end portion to said second end portion of said arm, said surface having the same radius at all places along its axial extent and said radius being matched to the radius of said pinion gear bore.

5. In the combination of a differential housing having a pinion spider with at least one arm extending from a central portion of the differential housing at a first end portion to an outer portion of the differential housing at a second end portion, said arm having a centerline, and a pinion gear having a cylindrical bore through which said arm extends, the improvement comprising first and second opposed bearing portions on said arm for bearing engagement with said bore of said pinion gear, each said bearing portion comprising an arcuately and axially extending surface which tapers toward said centerline of said arm as it extends in the direction from said first end portion to said second end portion of said arm, said surface having the same radius at all places along its axial extent and said radius being matched to the radius of said pinion gear bore.

6. In the combination of a differential housing having a pinion spider with at least one arm extending from a central portion of the differential housing at a first end portion to an outer portion of the differential housing at a second end portion, said arm having a centerline, and a pinion gear having a cylindrical bore through which said arm extends, the improvement comprising a bearing portion on said arm for bearing engagement with said bore of said pinion gear, said bearing portion comprising an arcuately and axially extending surface which tapers toward said centerline of said arm as it extends in the direction from said first end portion to said second end portion of said arm, said surface having the same radius at all places along its axial extent and said radius being matched to the radius of said pinion gear bore.

7. In the combination of a differential housing having a concave spherical inner surface, a pinion spider having at least one arm extending from a central portion of the differential housing at a first end portion to an outer portion of the differential housing at a second end portion, said arm having a first axis, and a pinion gear having a cylindrical bore thorugh which said arm extends and also having a convex spherical surface for engagement with said concve spherical surface of said differential housing, the improvement comprising a bearing portion on said arm for bearing engagement with said bore of said pinion gear, said bearing portion comprising a cylindrical surface generated about a second axis, said second axis extending at an acute angle with respect to said first axis and tapering away from said first axis as it extends in the direction from said first end portion to said second end portion of said arm, said cylindrical surface being matched to said cylindrical bore of said pinion gear.

8. In the combination of a differential housing having a pinion spider with at least one arm extending from a central portion of the differential housing at a first end portion to an outer portion of the differential housing at a second end portion, said arm having a first axis, and a pinion gear having a cylindrical bore through which said arm extends, the improvement comprising a bearing portion on said arm for bearing engagement with said bore of said pinion gear, said bearing portion comprising a cylindrical surface generated about a second axis, said second axis extending at an acute angle with respect to said first axis and tapering away from said first axis as it extends in the direction from said first end portion to said second end portion of said arm.

* * * * *